US010873272B2

(12) United States Patent
Kitou et al.

(10) Patent No.: US 10,873,272 B2
(45) Date of Patent: Dec. 22, 2020

(54) PULSE WIDTH MODULATION METHOD

(71) Applicant: DAIKIN INDUSTRIES, LTD., Osaka (JP)

(72) Inventors: Minoru Kitou, Osaka (JP); Naoto Kobayashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/486,246

(22) PCT Filed: Mar. 28, 2018

(86) PCT No.: PCT/JP2018/012827

§ 371 (c)(1),
(2) Date: Aug. 15, 2019

(87) PCT Pub. No.: WO2018/181506

PCT Pub. Date: Oct. 4, 2018

(65) Prior Publication Data

US 2020/0244185 A1 Jul. 30, 2020

(30) Foreign Application Priority Data

Mar. 28, 2017 (JP) ................................ 2017-062653

(51) Int. Cl.
*H02M 7/527* (2006.01)
*H02M 7/539* (2006.01)
(Continued)

(52) U.S. Cl.
CPC .......... *H02M 7/527* (2013.01); *H02M 7/539* (2013.01); *H02P 21/22* (2016.02); *H02P 27/08* (2013.01); *H02M 1/36* (2013.01)

(58) Field of Classification Search
CPC .... H02M 7/527; H02M 7/539; H02M 7/5395; H02M 1/36; H02P 27/08; H02P 21/22
See application file for complete search history.

(56) References Cited

U.S. PATENT DOCUMENTS 5,942,876 A * 8/1999 Maekawa ......... H02M 7/53875 318/801
6,088,246 A * 7/2000 Okuyama ........... H02M 7/5395 363/132
(Continued)

FOREIGN PATENT DOCUMENTS

JP 2001-286183 A 10/2001
JP 5490249 B2 5/2014
(Continued)

OTHER PUBLICATIONS

Daijyo et al. "On PWM Patterns and Harmonic Analysis of a General Purpose Inverter for Induction Motor Drives", The Institute of Electrical Engineers of Japan Transactions D, the Institute of Electrical Engineers of Japan, 1989, vol. 109, No. 11, p. 809-816.
(Continued)

*Primary Examiner* — Alex Torres-Rivera
(74) *Attorney, Agent, or Firm* — Birch, Stewart, Kolasch & Birch, LLP

(57) ABSTRACT

A locus of integrals, in terms of time, of unit voltage vectors forms a loop within a period shorter than a reciprocal of a maximum value of an operating frequency, in terms of electrical angle, of a compressor motor, the unit voltage vectors being voltage vectors that are units composing an instantaneous space vector indicating voltage which an inverter for driving the compressor motor outputs except in a dead time period.

14 Claims, 9 Drawing Sheets

(51) Int. Cl.
*H02P 27/08* (2006.01)
*H02P 21/22* (2016.01)
*H02M 1/36* (2007.01)

(56) References Cited

U.S. PATENT DOCUMENTS

| | | | | |
|---|---|---|---|---|
| 6,605,912 | B1 * | 8/2003 | Bharadwaj .......... | H02P 21/0089 318/400.02 |
| 9,077,274 | B2 | 7/2015 | Shinomoto et al. | |
| 9,543,887 | B2 | 1/2017 | Hatakeyama et al. | |
| 2003/0098298 | A1 | 5/2003 | Dohmae et al. | |
| 2006/0208690 | A1 * | 9/2006 | Ueda ...................... | B62D 5/046 318/807 |
| 2007/0222220 | A1 * | 9/2007 | Huang .................... | F02N 11/04 290/31 |
| 2008/0136380 | A1 * | 6/2008 | Hoffmann ............... | H02P 21/30 322/29 |
| 2008/0197799 | A1 * | 8/2008 | Tomigashi ............. | H02P 21/22 318/768 |
| 2010/0060211 | A1 * | 3/2010 | Hashimoto ............. | H02P 27/08 318/400.02 |
| 2012/0025749 | A1 * | 2/2012 | Lai .......................... | H02P 21/09 318/801 |
| 2013/0221885 | A1 * | 8/2013 | Hunter ...................... | H02P 6/34 318/400.15 |
| 2015/0236628 | A1 | 8/2015 | Wang et al. | |
| 2016/0020708 | A1 | 1/2016 | Nakagawa et al. | |
| 2016/0359442 | A1 * | 12/2016 | Zhao ....................... | H02P 21/06 |
| 2017/0241691 | A1 | 8/2017 | Yamakawa et al. | |

FOREIGN PATENT DOCUMENTS

| | | | |
|---|---|---|---|
| JP | 5693617 | B2 | 4/2015 |
| JP | 5737445 | B2 | 6/2015 |
| WO | WO 2016/071965 | A1 | 5/2016 |

OTHER PUBLICATIONS

International Search Report, issued in PCT/JP2018/012827, PCT/ISA/210, dated Jun. 26, 2018.

Ohyama et al. “A Novel Current Control Technique for Voltage Source Inverter in Field Oriented Control”, the Institute of Electrical Engineers of Japan Transactions B, the Institute of Electrical Engineers of Japan, 1985, vol. 105, No. 11, p. 901-908.

* cited by examiner

F I G. 1
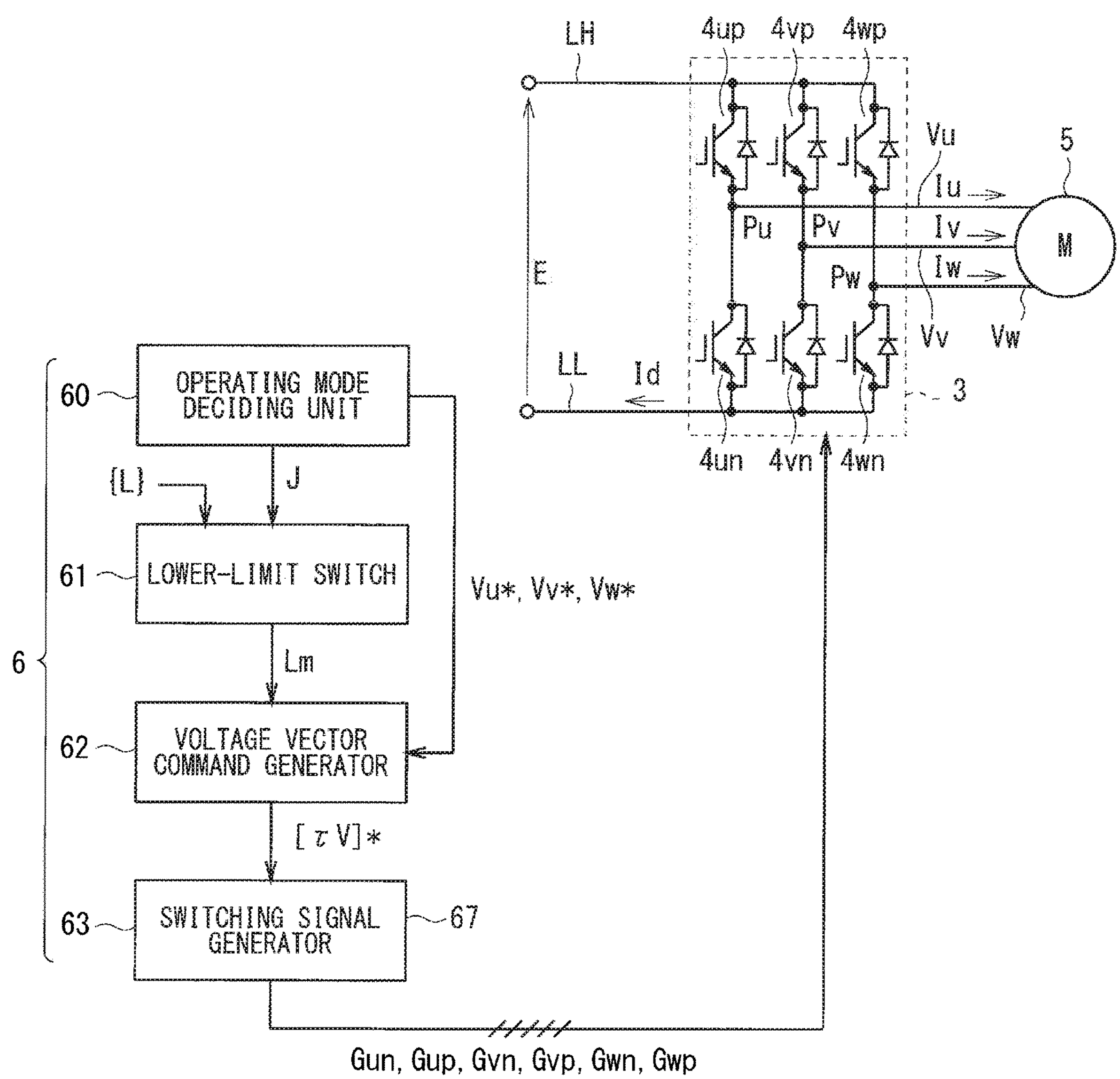

F I G. 3
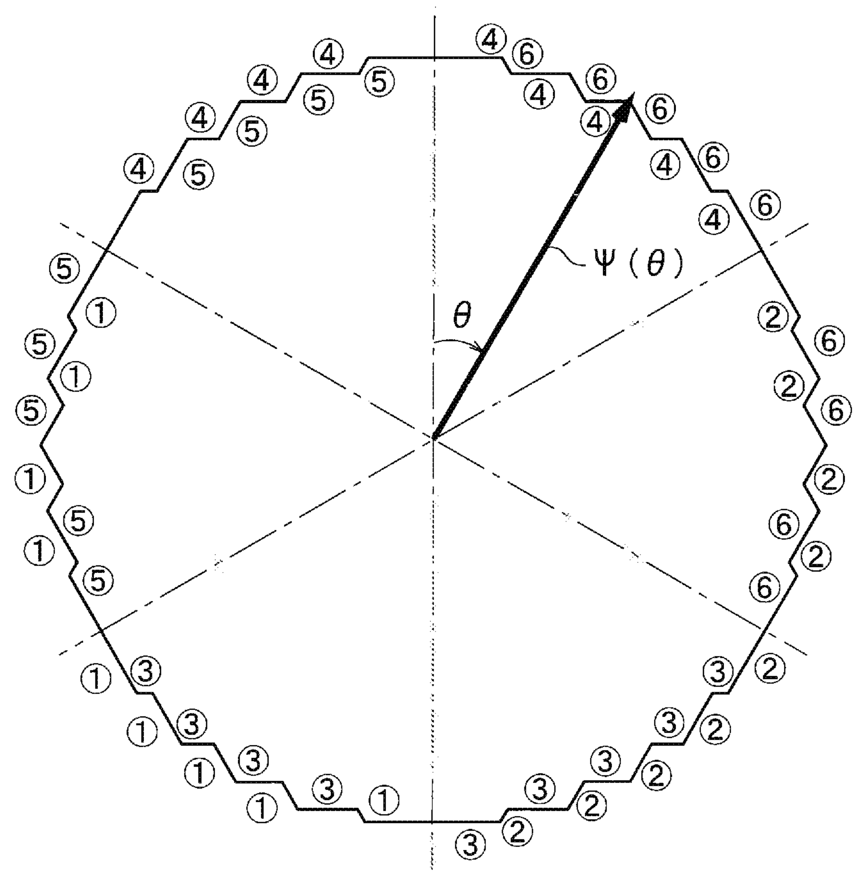

F I G. 4
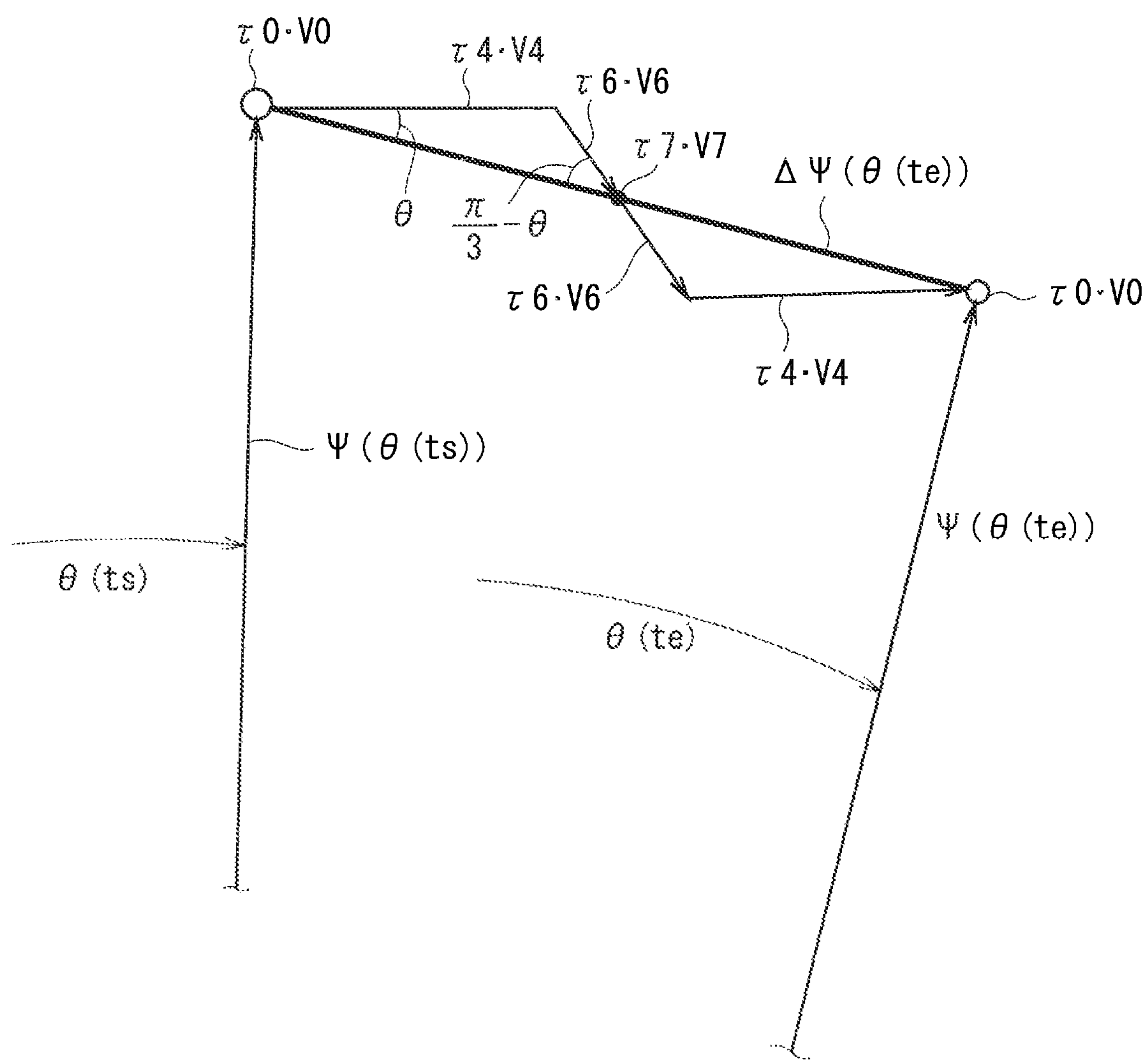

F I G. 6
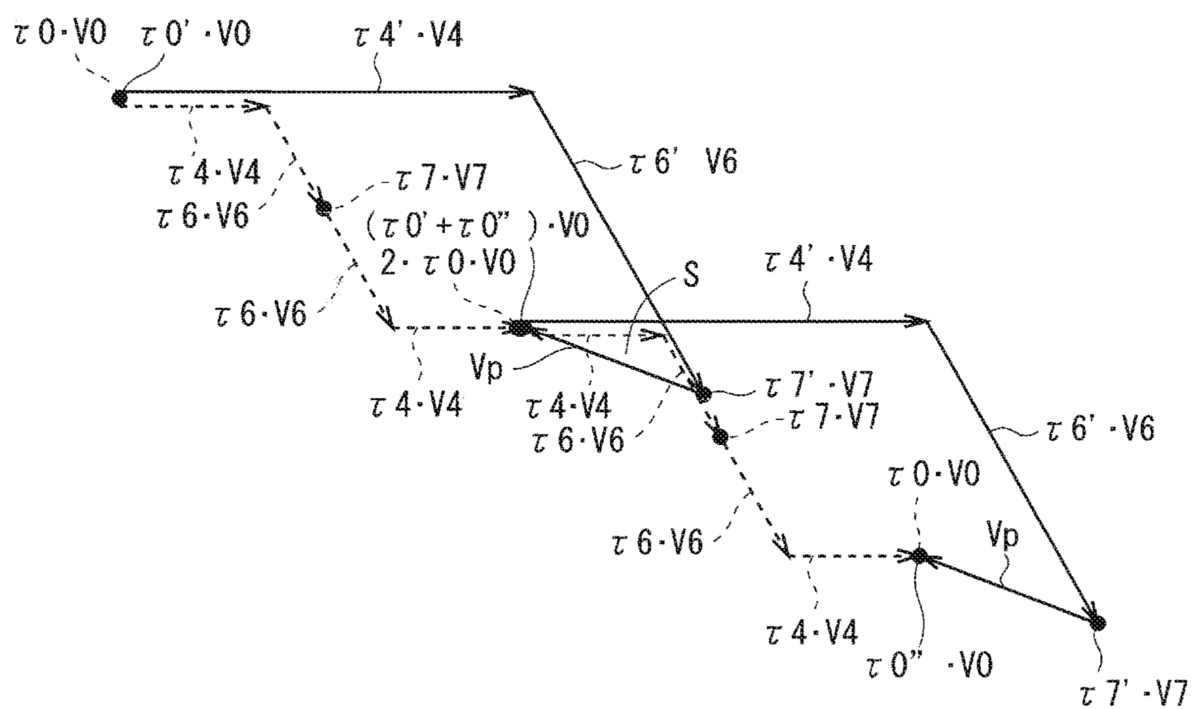

F I G. 7
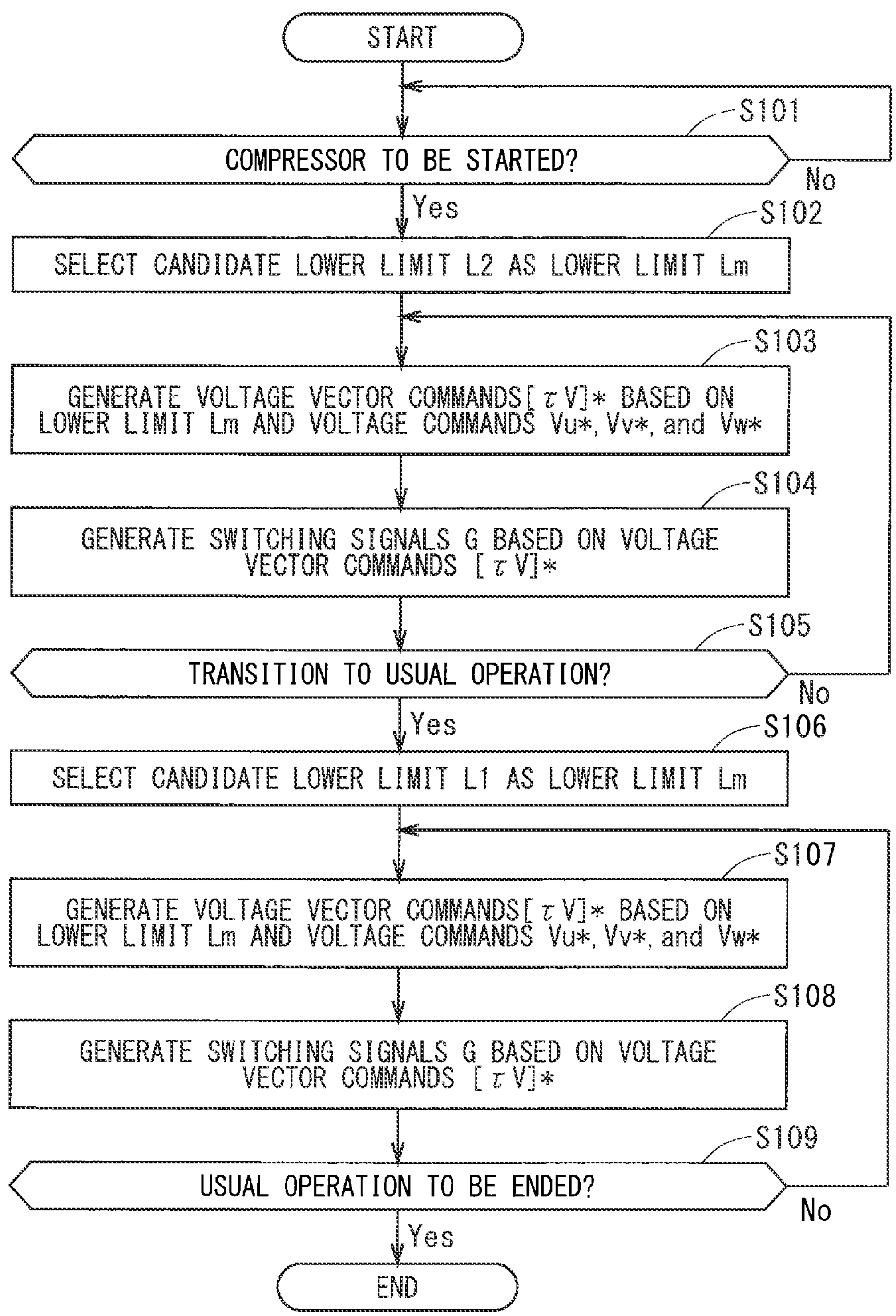

F I G. 9
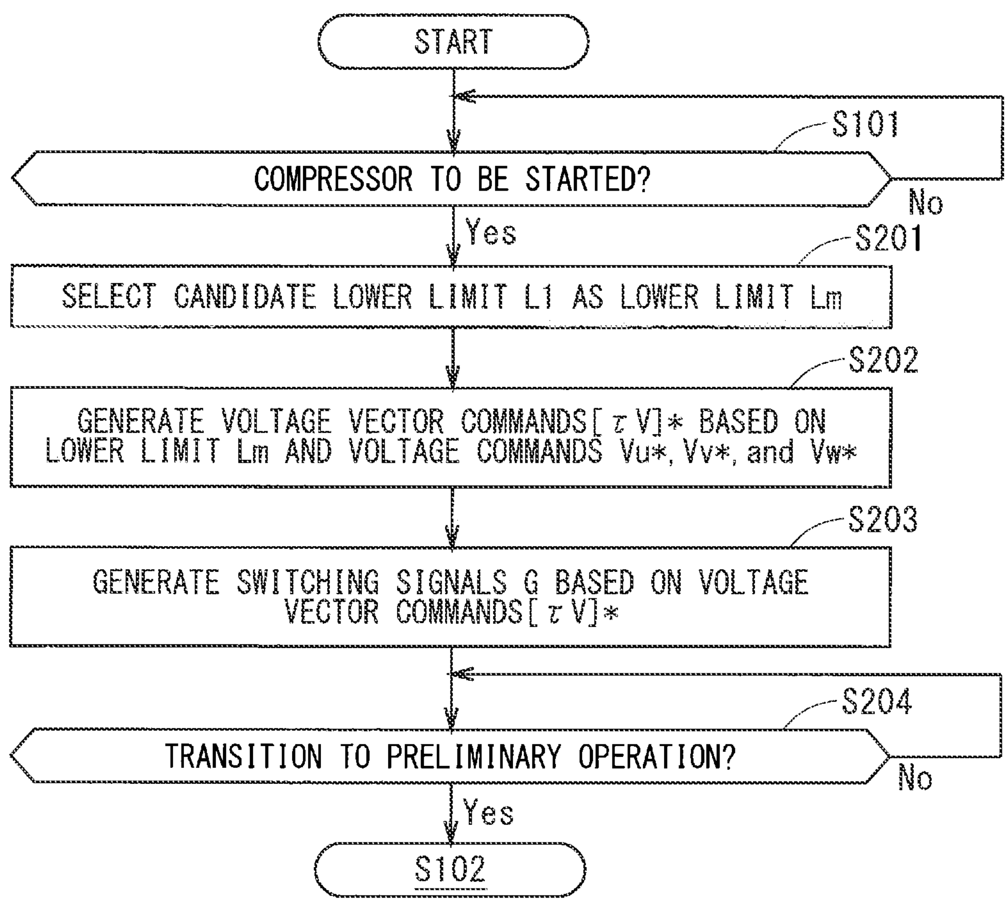

PULSE WIDTH MODULATION METHOD

TECHNICAL FIELD

The present disclosure relates to a technique for controlling an inverter by using pulse width modulation.

BACKGROUND ART

As a technique for controlling an inverter that drives a compressor, for example, a technique described by Japanese Patent No. 5490249 below is available. Here, a compressor is a concept that includes not only a compression element (for example, a rotary compressor) that compresses a target to be compressed (for example, a refrigerant) but also a compressor motor that drives the compression element. Japanese Patent No. 5490249 discloses a technique for generating preheating heat with iron loss of the compressor.

In Japanese Patent No. 5490249, high-frequency heating is used in preheating to suppress power consumption. A similar technique is also introduced by Japanese Patent No. 5693617.

It is an object of the present disclosure to provide a technique for causing a compressor motor to generate preheating heat.

Means to Solve the Problems

In a first aspect of a pulse width modulation method of the present disclosure, a locus of integrals ($\Psi(\theta)$), in terms of time, of unit voltage vectors forms a loop (S) within a period shorter than a reciprocal of a maximum value of an operating frequency, in terms of electrical angle, of a compressor motor (5), the unit voltage vectors being voltage vectors that are units composing an instantaneous space vector indicating voltage (Vu, Vv, Vw) which an inverter (3) for driving the compressor motor (5) outputs except in a dead time period.

A second aspect of the pulse width modulation method of the present disclosure is the first aspect thereof in which the loop (S) is formed by a locus of integrals, in terms of time, of at least three types of non-zero voltage vectors that are the voltage vectors having non-zero magnitudes.

A third aspect of the pulse width modulation method of the present disclosure is the first or second aspect thereof in which the period is a control cycle (T0) for the inverter (3).

A fourth aspect of the pulse width modulation method of the present disclosure is any of the first to third aspects thereof in which an increase in a magnitude of the loop or an increase in a frequency of occurrence of the loop increases a heating value of the compressor motor (5).

A fifth aspect of the pulse width modulation method of the present disclosure is any of the first to fourth aspects thereof in which the loop is formed in a state where the compressor motor (5) remains stopped.

A sixth aspect of the pulse width modulation method of the present disclosure is any of the first to fourth aspects thereof in which the loop is formed in a state where the compressor motor (5) is rotating.

A seventh aspect of the pulse width modulation method of the present disclosure is any of the first to sixth aspects thereof in which a lower limit (Lm) of vector widths is equal to a second value (L2) larger than a first value (L1) that is set in a usual operation of the compressor motor (5), the vector widths corresponding to lengths of times ($\tau4'$, $\tau6'$) for which at least a pair of non-zero voltage vectors (V4, V6) that are the unit voltage vectors having non-zero magnitudes are continuously maintained respectively.

An eighth aspect of the pulse width modulation method of the present disclosure is the seventh aspect thereof in which in a period during which the lower limit (Lm) is set to the first value (L1), in a period during which the unit voltage vectors are maintained, current that is input into the inverter (3) is measurable as DC current (Idc).

A ninth aspect of the pulse width modulation method of the present disclosure is any of the seventh and eighth aspects thereof in which prior to a period during which the lower limit (Lm) is set to the second value (L2), the lower limit is set to a third value (L3) smaller than the second value (L2), and the inverter (3) is controlled to start the compressor motor (5).

According to the pulse width modulation method of the present disclosure, a compressor motor is caused to generate preheating heat.

Objects, features, aspects, and advantages of the present disclosure will become more apparent from the following detailed description and the accompanying drawings.

BRIEF DESCRIPTION OF DRAWINGS

FIG. 1 is a block diagram describing a power converter controller according to each embodiment;

FIG. 3 is a vector diagram showing a magnetic flux vector indicating rotational magnetic flux and a locus formed thereby in a complex plane;

FIG. 4 is a vector diagram showing a difference command;

FIG. 6 is a vector diagram showing voltage vector commands for two predetermined cycles;

FIG. 7 is a flowchart describing an operation in a first embodiment;

FIG. 9 is a flowchart showing part of an operation in a third embodiment.

DESCRIPTION OF EMBODIMENTS

<Basic Configuration>

Figure 2:
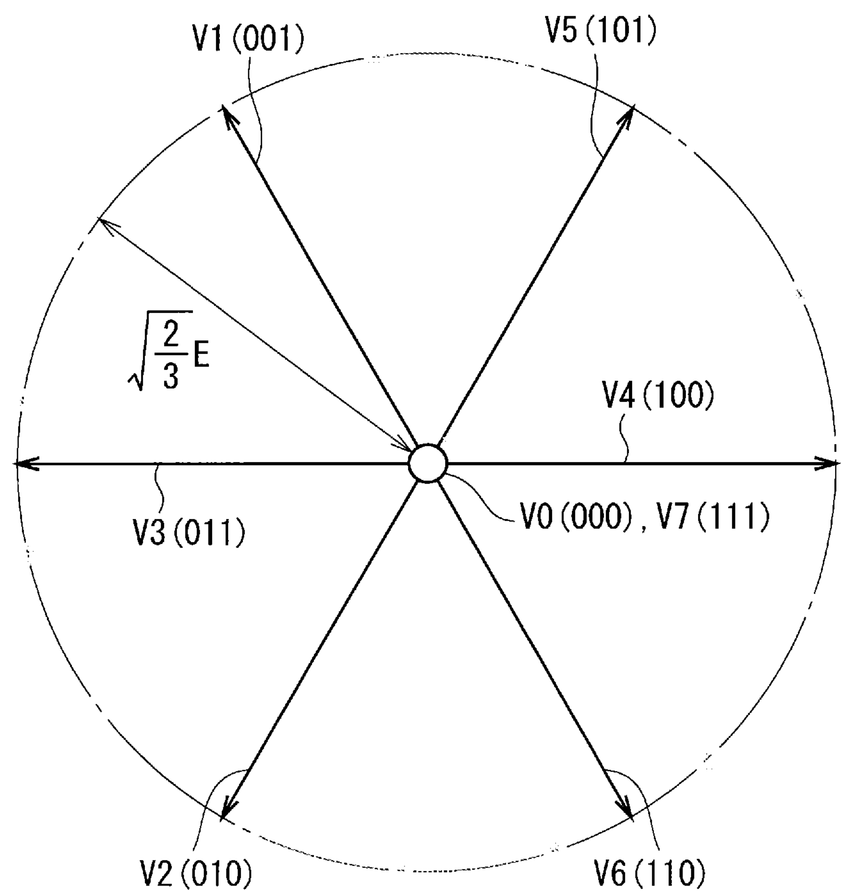
FIG. 2 is a vector diagram showing voltage vectors used in each embodiment.

FIG. 1 is a block diagram describing a power converter controller according to embodiments described below. An inverter 3, which is a power converter, includes three current paths that are connected in parallel to each other between a pair of DC buses LH and LL. DC voltage E is applied across the DC buses LH and LL, and a potential of the DC bus LH is higher than a potential of the DC bus LL.

The three current paths have respective nodes Pu, Pv, and Pw. The current path having the node Pu includes a pair of switches 4*up* and 4*un* that are connected in series via the node Pu between the DC buses LH and LL. The current path having the node Pv includes a pair of switches 4*vp* and 4*vn* that are connected in series via the node Pv between the DC buses LH and LL. The current path having the node Pw includes a pair of switches 4*wp* and 4*wn* that are connected in series via the node Pw between the DC buses LH and LL. The switches 4*up*, 4*vp*, and 4*wp* are respectively disposed closer to the DC bus LH than the switches 4*un*, 4*vn*, and 4*wn* are.

The inverter 3 applies voltage Vu, Vv, and Vw from the respective nodes Pu, Pv, and Pw to a compressor motor (hereinafter simply referred to as "motor") 5 according to opening and closing (conducting/non-conducting states) of the switches 4*up*, 4*vp*, 4*wp*, 4*un*, 4*vn*, and 4*wn* to supply current Iu, Iv, and Iw to the motor 5. The current Iu, Iv, and Iw is three-phase AC line current, and the voltage Vu, Vv, and Vw is three-phase phase voltage. The motor 5 is a three-phase AC motor. In the motor 5, rotational magnetic flux corresponding to a magnetic flux vector described later is formed.

An inverter controller 6, which is a power converter controller, outputs switching signals Gup, Gyp, Gwp, Gun, Gvn, and Gwn for respectively controlling opening and closing of the switches 4*up*, 4*vp*, 4*wp*, 4*un*, 4*vn*, and 4*wn* to control the inverter 3. That is to say, a switching pattern of the inverter 3 is directly determined by the switching signals Gup, Gyp, Gwp, Gun, Gvn, and Gwn.

More specifically, the inverter controller 6 includes an operating mode deciding unit 60, a lower-limit switch 61, a voltage vector command generator 62, and a switching signal generator 63.

The lower-limit switch 61 receives a candidate lower limit group {L} and a switch signal J. The candidate lower limit group {L} is a set of a plurality of candidates, for a lower limit, that are different from each other. The lower-limit switch 61 selects one from among the plurality of candidates on the basis of the switch signal J and outputs the selected one as a lower limit Lm.

The voltage vector command generator 62 receives voltage commands Vu*, Vv*, and Vw*, which are command values of the respective voltage Vu, Vv, and Vw, and the lower limit Lm and outputs voltage vector commands [τV]* through processing described later. A mark [ ] is herein used as an expression to clarify that a mark enclosed by the mark [ ] has meaning as a whole, and does not represent the product of τ and V (the same applies hereinafter).

The voltage vector commands [τV]* include information on the switching pattern of the inverter 3 and time for which the switching pattern is used, as described later.

The operating mode deciding unit 60 makes a decision on whether to cause a compressor to start, operate, stop, perform a preheating operation, or the like and outputs the switch signal J that differs depending on the decision. Further, the operating mode deciding unit 60 outputs the voltage commands Vu*, Vv*, and Vw* for causing the compressor to start, operate, stop, perform a preheating operation, or the like. Details of a technique for generating the voltage commands Vu*, Vv*, and Vw* are omitted herein as the technique is known. Further, it is apparent that making a decision on whether to cause the compressor to start, operate, stop, perform a preheating operation, or the like and generating the switch signal J that differs depending on the decision can be achieved by using a well-known technique, and therefore, details thereof are also omitted herein.

The switching signal generator 63 generates the switching signals Gup, Gyp, Gwp, Gun, Gvn, and Gwn on the basis of the voltage vector commands [τV]*, more specifically, on the basis of the switching pattern and the time for which the switching pattern is used, which are included in the voltage vector commands [τV]*. Details of a method for generating the switching signals are omitted herein as the method is known.

FIG. 2 is a vector diagram showing unit voltage vectors used in each embodiment. As is known, the unit voltage vectors are shown in the complex plane. The inverter 3 operates so as to correspond to three phases, namely, a U phase, a V phase, and a W phase, and the voltage E or voltage 0 is ideally applied across the DC bus LL and the nodes Pu, Pv, and Pw. As for a three-digit numerical value determining each unit voltage vector, 1 or 0 in the fours place is used in accordance with the voltage E or 0 applied to the node Pu, 1 or 0 in the twos place is used in accordance with the voltage E or 0 applied to the node Pv, and 1 or 0 in the ones place is used in accordance with the voltage E or 0 applied to the node Pw. Further, the three-digit value is grasped as a binary number, and a value obtained by converting the binary number into a decimal number is used as the number of the unit voltage vector. In FIG. 2, the initial points of all the unit voltage vectors are located at the origin of the complex plane.

A unit voltage vector V0 corresponding to applying the voltage 0 to each of the nodes Pu, Pv, and Pw and a unit voltage vector V7 corresponding to applying the voltage E to each of the nodes Pu, Pv, and Pw have no magnitudes in FIG. 2. These unit voltage vectors V0 and V7 are commonly referred to as zero voltage vectors. The zero voltage vector V0 corresponds to connecting the motor 5 to only the DC bus LL, and the zero voltage vector V7 corresponds to connecting the motor 5 to only the DC bus LH.

Unit voltage vectors V1 to V6 other than the zero voltage vectors are herein referred to as non-zero voltage vectors. The non-zero voltage vectors V1 to V6 are shown in the complex plane with the zero voltage vectors as the initial points of the non-zero voltage vectors V1 to V6 and are located every angle of $\pi/3$. The zero voltage vectors V0 and V7 are located at the origin in the complex plane.

Since the DC voltage E is input into the inverter 3 through the DC buses LH and LL, the non-zero voltage vectors each have a magnitude of $\sqrt{(2/3)}\cdot E$. Variations in the magnetic flux vector indicating rotational magnetic flux linked with a coil are expressed as time integrals (integrals with respect to time) of the non-zero voltage vectors.

To associate the time integrals with the magnitudes of the non-zero voltage vectors, description is yet made below on the assumption that the non-zero voltage vectors each have a magnitude of 1. In other words, description is made on the assumption that $E=\sqrt{(3/2)}$ is satisfied.

FIG. 3 is a vector diagram showing a magnetic flux vector $\Psi(\theta)$ indicating rotational magnetic flux and a locus of a terminal point of the magnetic flux vector $\Psi(\theta)$ in the complex plane. From the perspective of making the rotational magnetic flux sinusoidal, the locus is ideally circular. The locus of the terminal point of the magnetic flux vector $\Psi(\theta)$, however, is polygonal as actual control over the inverter 3 is based on the above-mentioned unit voltage vectors.

In FIG. 3, circled numbers added to respective sides of the polygon are the numbers of the unit voltage vectors. The time integrals of the unit voltage vectors indicated by the numbers are shown by the sides.

As understood from FIG. 3, the complex plane is divided on an angle θ into areas set every angle of $\pi/3$. The angle θ is herein defined as an angle that the magnetic flux vector $\Psi(\theta)$ forms in a clockwise direction with respect to a composite vector obtained by composing the unit voltage vectors V1 and V5 ($0\leq\theta\leq2\pi$).

In a usual circular approximation method (for example, see "On PWM Patterns and Harmonic Analysis of a General Purpose Inverter for Induction Motor Drives", Daijyo and three others, the Institute of Electrical Engineers of Japan Transactions D, the Institute of Electrical Engineers of Japan, 1989, Vol. 109, No. 11, pp. 809-816), the non-zero voltage vectors used in each of the areas are limited as shown below. This is because it is desirable that the locus of the terminal point of the magnetic flux vector $\Psi(\theta)$ be circular in the complex plane as described above.

$0\leq\theta\leq\pi/3$: the non-zero voltage vectors V4 and V6;

$\pi/3\leq\theta 2\pi/3$: the non-zero voltage vectors V6 and V2;

$2\pi/3\leq\theta\leq\pi$: the non-zero voltage vectors V2 and V3;

$\pi\leq\theta\leq 4\pi/3$: the non-zero voltage vectors V3 and V1;

$4\pi/3\leq\theta 5\pi/3$: the non-zero voltage vectors V1 and V5; and $5\pi/3\leq\theta 2\pi$: the non-zero voltage vectors V5 and V4.

Control over the magnetic flux in these areas is similar every angle of $\pi/3$ concerning the angle $\theta$, and thus the following description including description in each of the embodiments is made by taking only a case where $0\leq\theta\leq\pi/3$ is satisfied as an example. This is because description in this case is applied to the other areas by only shifting the reference of the angle $\theta$ by an angle of $\pi/3$.

FIG. 4 is a vector diagram showing a difference command $\Delta\Psi(\theta(te))$. Magnetic flux vectors $\Psi(\theta(ts))$ and $\Psi(\theta(te))$ respectively indicate magnetic flux vectors $\Psi(0)$ at a start time point ts and an end time point to (=ts+T0) of a predetermined cycle T0, to which a control cycle T0 of the inverter 3 is applied. The difference command $\Delta\Psi(\theta(te))$ matches a vector pointing from the terminal point of the magnetic flux vector $\Psi(\theta(ts))$ to the terminal point of the magnetic flux vector $\Psi(\theta(te))$. The vector is equivalent to a time integral of an instantaneous space vector indicating the three-phase voltage Vu, Vv, and Vw in one predetermined cycle T0 in the complex plane, and the difference command $\Delta\Psi(\theta(te))$ itself does not require obtaining the pair of the terminal points of the above-mentioned magnetic flux vectors.

From the perspective of making the rotational magnetic flux sinusoidal, it is desirable to position the terminal points of the magnetic flux vectors $\Psi(\theta(ts))$ and $\Psi(\theta(te))$ on a circumference by performing proper control in the predetermined cycle T0 shorter than a cycle of the rotational magnetic flux. It is therefore desirable to obtain a plurality of vectors (hereinafter, also referred to as element vectors) composing the difference command $\Delta\Psi(\theta(te))$ in the predetermined cycle T0.

FIG. 4 shows the element vectors used in the usual circular approximation method. In FIG. 4, the element vectors are respectively shown as time integrals of the unit voltage vectors, and, for simplicity, description is made on the assumption that the non-zero voltage vectors each have a magnitude of 1 as described above. The magnitude (length) of each element vector corresponding to a corresponding one of the non-zero voltage vectors indicates time for which the one of the non-zero voltage vectors is continuously maintained. Further, the direction (direction from the initial point to the terminal point: the same applies hereinafter) of each element vector corresponding to a corresponding one of the unit voltage vectors matches the direction of the one of the unit voltage vectors. The element vectors (hereinafter, also referred to as no-value vectors) corresponding to the zero voltage vectors V0 and V7 (specifically, being the time integrals of the zero voltage vectors), as exceptions, have no magnitudes as the zero voltage vectors V0 and V7 have no magnitudes as shown in FIG. 2.

FIG. 4 shows a case where the voltage vector commands [τV]* sequentially maintain, in the predetermined cycle T0, the zero voltage vector V0 for time τ0, the non-zero voltage vector V4 for time τ4, the non-zero voltage vector V6 for time τ6, the zero voltage vector V7 for time τ7, the non-zero voltage vector V6 for the time τ6, the non-zero voltage vector V4 for the time τ4, and the zero voltage vector V0 for the time T0.

In FIG. 4, as described above, since the element vectors are shown as the time integrals of the unit voltage vectors, the element vector obtained by maintaining the non-zero voltage vector V4 for the time τ4 is, for example, shown by the product τ4·V4 of the non-zero voltage vector V4 and the time τ4. The other element vectors are shown in a similar manner.

Description is continued referring back to FIG. 1. The voltage vector command generator 62 generates the voltage vector commands [τV]*. When description is made in line with FIG. 4 described above, the voltage vector commands [τV]* consist of element vectors τ0·V0 τ4·V4, τ6·V6, τ7·V7, τ6·V6, τ4·V4, and τ0·V0 (T0=τ0+τ4+τ6+τ7+τ6+τ4+τ0).

Voltage vector commands corresponding to non-zero voltage vectors are referred to as non-zero voltage vector commands. FIG. 4 shows the element vectors τ4·V4 and τ6·V6 composing non-zero voltage vector commands as examples.

It is noted that the element vectors corresponding to the zero voltage vectors V0 and V7 do not directly contribute to composition of the difference command $\Delta\Psi(\theta)$. The times τ0 and τ7 for which the zero voltage vectors V0 and V7 are respectively maintained can be determined depending on the times τ4 and τ6 for which the element vectors (hereinafter, also referred to as non-zero element vectors) corresponding to the non-zero voltage vectors are maintained (2·τ0+τ7=T0−2·τ4−2·τ6).

Here, the unit voltage vectors used in the present disclosure are units that compose the instantaneous space vector indicating the voltage Vu, Vv, and Vw output except in a so-called dead time period (a period in which at least one switch pattern is presented among a switch pattern in which both the switches 4*up* and 4*un* are turned off, a switch pattern in which both the switches 4*vp* and 4*vn* are turned off, and a switch pattern in which both the switches 4*wp* and 4*wn* are turned off).

<Cause of Generation of Preheating Heat in the Present Embodiments>

The voltage vector command generator 62 outputs voltage vector commands [τV]* including at least a pair of non-zero voltage vector commands every predetermined cycle T0. Hereinafter, the voltage vector commands [τV]* are described with reference to FIG. 5 and FIG. 6.

Figure 5:
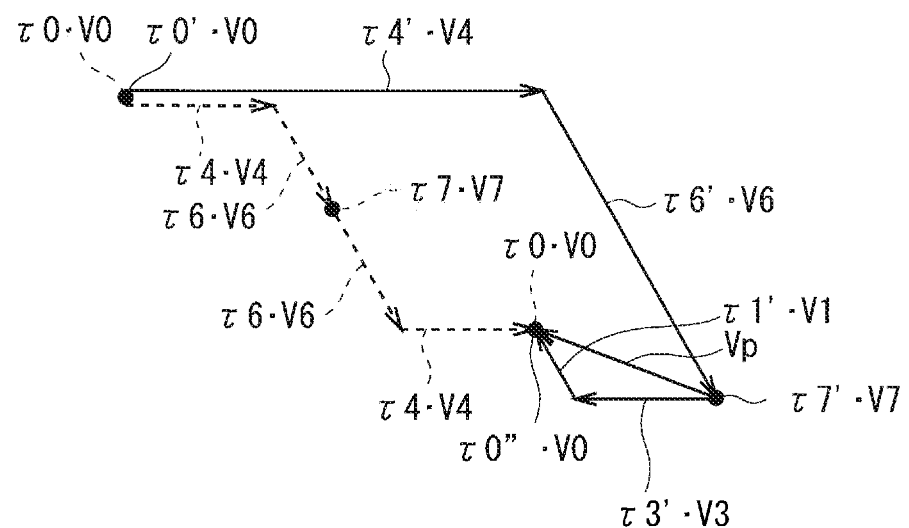
FIG. 5 is a vector diagram showing voltage vector commands for one predetermined cycle.

FIG. 5 is a vector diagram showing voltage vector commands [τV]* for one predetermined cycle T0. Element vectors τ0·V0, τ4·V4, τ6·V6, τ7·V7, τ6·V6, τ4·V4, and τ0·V0 shown by dashed lines in FIG. 5 are the same as the element vectors shown in FIG. 4 as examples. When element vectors τ0'·V0, τ4'·V4, τ6'·V6, τ7'·V7, τ3'·V3, τ1'·V1, and τ0"·V0 shown by solid lines in FIG. 5 are composed, the difference command $\Delta\Psi(\theta(te))$ shown in FIG. 4 as an example is obtained. In FIG. 5, composition of the element vectors τ1'·V1 and τ3'·V3 is also shown as an element vector Vp. Here, T0=τ0'+τ4'+τ6'+τ7'+τ3'+τ1'+τ0" is satisfied. Description of a specific method for determining the element vectors shown by solid lines is omitted herein as the method is known from, for example, Japanese Patent No. 5737445.

FIG. 6 is a vector diagram showing voltage vector commands [τV]* for two consecutive predetermined cycles T0. For the sake of simplicity, voltage vector commands [τV]* for consecutively achieving two difference commands $\Delta\Psi(\theta)$ that are equal to each other are shown here. To avoid a complicated drawing, composition of element vectors $\tau 1' \cdot V1$ and $\tau 3' \cdot V3$, which are non-zero voltage vector commands, is shown as an element vector Vp in FIG. 6.

The element vectors $\tau 1' \cdot V1$ and $\tau 3' \cdot V3$ that compose the element vector Vp respectively correspond to non-zero voltage vectors V1 and V3. With reference to FIG. 2, the directions of the non-zero voltage vector V1 and V3 are respectively opposite to the directions of the non-zero voltage vector V6 and V4 that are used in a usual operation when $0 \leq \theta \leq \pi/3$ (the non-zero voltage vectors V1 and V3 are located so as to form an angle of $\pi$ with the non-zero voltage vectors V6 and V4 respectively in the complex plane). By using the element vector Vp as described above, near the boundary between two consecutive periods each having the predetermined cycle T0, the locus of the terminal point of the magnetic flux vector $\Psi(\theta)$ forms a loop (closed curve) S.

As described above, the loop S is formed within a period shorter than the cycle of the rotational magnetic flux. With the rotational magnetic flux, the motor 5 is rotated. It is therefore desirable that the loop S be formed within a period shorter than the reciprocal of the maximum value of the operating frequency of the motor 5 in terms of electrical angle. For example, the loop S is formed within the control cycle T0 of the inverter 3.

If the same $\Delta\Psi(\theta(te))$ is consecutively obtained at all times, it is obviously not possible to use the circular approximation method. FIG. 6 only shows the voltage vector commands $[\tau V]^*$ for the two cycles that are used for the purpose of description. However, as described above (as understood with reference to FIG. 3 and FIG. 5), the non-zero voltage vectors V4 and V6 are used in a range of $0 \leq \theta \leq \pi/3$, and the element vector Vp has the components, namely, the non-zero voltage vectors V1 and V3. Therefore, the loop S is formed in most cases.

The loop S has, for example, a triangular shape and is formed of a locus of time integrals of at least three types of non-zero voltage vectors. Two non-zero voltage vectors among the three types of non-zero voltage vectors are selected in such a manner that one non-zero voltage vector is selected from each of the two areas obtained by division along a straight line that passes through the origin in the complex plane shown in FIG. 2. It is noted that the straight line is not parallel to any of the non-zero voltage vectors.

The existence of the loop S as described above increases iron loss as introduced by "A Novel Current Control Technique for Voltage Source Inverter in Field Oriented Control", Ohyama and four others, the Institute of Electrical Engineers of Japan Transactions B, the Institute of Electrical Engineers of Japan, 1985, Vol. 105, No. 11, pp. 901-908". Such iron loss generates preheating heat. Further, the present embodiments only use switching patterns that are used in a usual compressor operation (here, a pattern corresponding to the unit voltage vectors V1 and V3 as well as that corresponding to the unit voltage vectors V4 and V6).

Therefore, an increase in the magnitude of the loop S or an increase in the frequency of occurrence of the loop S can increase the heating value of the motor 5. A decrease in the magnitude of the loop S or a decrease in the frequency of occurrence thereof can decrease the heating value of the motor 5. The magnitude and the frequency of occurrence of the loop S can be adjusted as appropriate by using periods for which the non-zero voltage vectors are maintained (for example, the times $\tau 1'$, $\tau 3'$, $\tau 4'$, and $\tau 6'$).

The pattern corresponding to the unit voltage vectors V1 and V3 is not used in a usual operation when $0 \leq \theta \leq \pi/3$. However, the pattern corresponding to the unit voltage vectors V1 and V3 is used in a usual operation when $\pi \leq \theta \leq 4\pi/3$. Therefore, processing for generating the patterns is significantly easier than generation of a special pattern necessary for preheating using high-frequency heating. Accordingly, with the present embodiments, preheating heat is generated without complicated control processing.

In a case where preheating heat is obtained using high-frequency heating, a technique in which an inverter is switched with a special pattern for obtaining preheating heat is known (for example, Japanese Patent No. 5490249 and Japanese Patent No. 5693617). Such switching for preheating can be achieved by controlling the inverter using pulse width modulation, however, a pattern significantly different from the switching patterns used in a usual compressor operation is used. Therefore, the inverter is caused to perform the special pattern for preheating as well as the patterns for a usual compressor operation as the switching patterns, and control processing for performing the control becomes complicated. Such complicated control processing may result in an increase in a storage capacity necessary for a microcomputer that performs the control processing.

<Lower Limit Setting>

There may be a case where a lower limit is set for the magnitudes of element vectors. In an example case described in Japanese Patent No. 5737445, the lower limit is set from the perspective of current measurement. However, from the perspective of generating preheating heat, even if element vectors compose the same difference command $\Delta\Psi(\theta)$, it is desirable that the element vectors $\tau 1 \cdot V1$ and $\tau' 3 \cdot V3$ be generated. It is therefore desirable to make the element vectors $\tau 4' \cdot V4$ and $T'6 \cdot V6$ larger. When description is made in line with FIG. 5, $2 \cdot \tau 4 < \tau 4'$ and $2 \cdot \tau 6 << \tau 6'$ are satisfied.

Detailed description of a specific method for generating such element vectors is omitted as the method is known from, for example, Japanese Patent No. 5737445. It is noted that description is made of switching of a lower limit of vector widths, which correspond to the lengths of times (here, the times $\tau 4'$ and $\tau 6'$), for which at least a pair of unit voltage vectors (here, the unit voltage vectors V4 and V6) among the unit voltage vectors composing the instantaneous space vector, namely, the difference command $\Delta\Psi(\theta)$, are continuously maintained respectively.

Preheating of the compressor is heating in advance the compressor before a usual operation. It is therefore desirable to set the lower limit to a second value larger than a first value, which is a lower limit in a usual operation, before a usual operation. The period during which the lower limit is set to the second value is assumed to be a preheating period, and control is performed so that the locus of integrals of the unit voltage vectors (these can be considered to be the magnetic flux vector) forms the loop S in this preheating period. Specifically, voltage vector commands $[\tau V]^*$ that achieve such a locus are generated by the voltage vector command generator 62, and the switching signal generator 63 performs pulse width modulation on the basis of the voltage vector commands $[\tau V]^*$ to generate the switching signals Gup, Gyp, Gwp, Gun, Gvn, and Gwn. That is to say, a waveform with pulse width modulation is generated, and the inverter 3, the motor 5, and accordingly, the compressor are controlled on the basis of the waveform.

Such switching of the lower limit can be easily performed with the candidate lower limit group $\{L\}$ including the first value and the second value described above as candidate lower limits. The operating mode deciding unit 60 outputs the switch signal J that differs depending on whether a usual operation is not yet performed or a usual operation is being performed, and the lower-limit switch 61 selects one from among the first value and the second value on the basis of the switch signal J and outputs the selected one as the lower limit Lm.

From the perspective of reserving a period for detecting DC current Id (hereinafter "current detection") as described in Japanese Patent No. 5737445, it is obviously desirable that current input into the inverter 3 can be measured as DC current Idc in the period during which the lower limit is set to the first value, for example, in a period during which the unit voltage vectors are maintained in a usual operation. Specifically, when time Tmin required for current detection is introduced, non-zero voltage vector commands [τV]* including the element vectors τ4·V4 and τ6·V6 that satisfy Tmin<τ4 and Tmin<τ6 are generated.

By making the lower limit changeable, efficiency can be increased without the occurrence of unwanted iron loss in a usual operation, and iron loss, and accordingly, preheating heat can be generated before a usual operation.

Description is made below of a specific example of setting the lower limit Lm on the basis of the candidate lower limit group {L} and the switch signal J in each embodiment (that is, switching a lower limit that is selected from among the candidate lower limits as the lower limit Lm in accordance with the switch signal J).

It is noted that, for convenience sake, all embodiments assume that the candidate lower limit group {L} includes at least two candidate lower limits L1 and L2 having a relationship L1<L2. Further, in all embodiments, when control before a usual operation is performed, the switch signal J for causing the lower-limit switch 61 to select a candidate lower limit L2 (second value) as the lower limit Lm is output from the operating mode deciding unit 60. When a usual operation is performed, the switch signal J for causing the lower-limit switch 61 to select a candidate lower limit L1 (first value) as the lower limit Lm is output from the operating mode deciding unit 60.

First Embodiment

FIG. 7 is a flowchart describing an operation in a first embodiment. At step S101, the process branches off to a subsequent step in accordance with whether the compressor is to be started. In a case where the compressor is to be started (corresponding to "Yes" in FIG. 7), the process proceeds to step S102. In a case where the compressor is not to be started (corresponding to "No" in FIG. 7), the process does not proceed. The process proceeding from step S101 to step S102 can be decided by the operating mode deciding unit 60.

Step S102 is performed before step S105. Step S102 is a step in which the lower-limit switch 61 selects the candidate lower limit L2 as the lower limit Lm. Step S105 is a step in which selection as to whether to transition to a usual operation is made. That is to say, performing of step S102 corresponds to selection of the candidate lower limit L2 as the lower limit Lm when control before a usual operation is performed.

After step S102 is performed, step S103 is performed in which the voltage vector commands [τV]* are generated on the basis of the lower limit Lm and the voltage commands Vu*, Vv*, and Vw*. This generation is performed by the voltage vector command generator 62.

Figure 8:
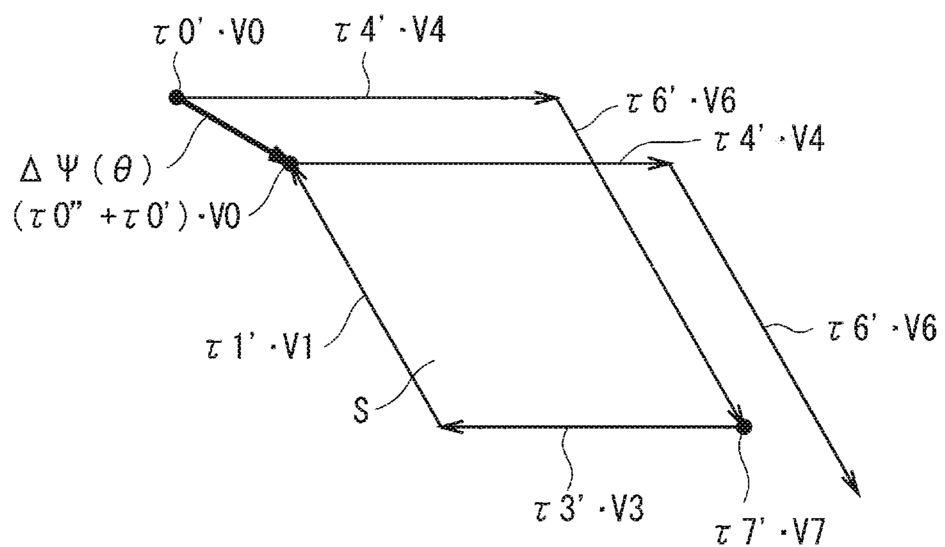
FIG. 8 is a vector diagram showing voltage vector commands for two predetermined cycles in the first embodiment.

FIG. 8 is a vector diagram showing voltage vector commands [τV]* for two predetermined cycles T0 in the first embodiment. For the sake of simplicity, voltage vector commands [τV]* for consecutively achieving two difference commands ΔΨ(θ) that are equal to each other are shown here as in FIG. 6.

It is noted that the magnitudes of the element vectors τ3'·V3 and τ1'·V1 are increased, and the difference command ΔΨ(θ) is decreased. Accordingly, preheating can be performed while rotation of the compressor before a usual operation is suppressed.

Rotation of the compressor before a usual operation might be allowed. However, from the perspective of enlarging the loop S to increase iron loss, and accordingly, preheating heat, it is desirable to decrease the difference command ΔΨ(θ) in the control before a usual operation. As the difference command ΔΨ(θ) decreases, a driving torque generated in the compressor decreases. If the driving torque is smaller than a load torque of the compressor, the compressor substantially remains stopped.

At this time, concurrently with formation of the loop S, AC current corresponding to the difference command ΔΨ(θ) flows into the motor 5 that remains stopped. In a case where the angle θ is set to a constant value, DC current flows into the motor 5 that remains stopped concurrently with formation of the loop S.

In other words, in a period during which the lower limit Lm is set to the candidate lower limit L2, control of the inverter 3 based on the instantaneous space vector can be performed without rotating the compressor.

For example, in this period, setting may be performed so as to satisfy τ3'=τ4' and τ1'=τ6' and the magnitudes of the element vectors τ3'·V3 and τ'1·V1 may be respectively made equal to the magnitudes of the element vectors τ4'·V4 and τ'6·V6 so that the magnitude of the difference command ΔΨ(θ) is zero. At this time, only high-frequency current flows into the motor 5.

As described above, by using two pairs of element vectors every control cycle T0 of the inverter 3, the directions of the element vectors in each pair are opposite to each other and that have the same magnitudes, the magnitude of the difference command ΔΨ(θ) can be equal to zero. Consequently, iron loss, and accordingly, preheating heat can be generated while the compressor remains stopped. Such generation of preheating heat, however, can be achieved regardless of the value of the lower limit Lm. That is to say, the use of such two pairs of element vectors is also one of the methods for generating preheating heat before a usual operation.

Description is further made referring back to FIG. 7. In step S104, the switching signals Gup, Gyp, Gwp, Gun, Gvn, and Gwn (collectively described as "switching signals G" in FIG. 7) are generated on the basis of the voltage vector commands [τV]* obtained in step S103. This generation is performed by the switching signal generator 63.

In step S105 following step S104, selection as to whether to transition to a usual operation is made as described above. This selection can be made by the operating mode deciding unit 60. In a case where a transition to a usual operation is not selected (corresponding to "No" in FIG. 7), steps S103, S104, and S105 are performed again, and generation of preheating heat is maintained. In a case where a transition to a usual operation is selected (corresponding to "Yes" in FIG. 7), step S106 is performed.

Step S106 is a step in which the lower-limit switch 61 selects the candidate lower limit L1 as the lower limit Lm. That is to say, performing of step S106 corresponds to selection of the candidate lower limit L1 as the lower limit Lm when a usual operation is to be performed.

Thereafter, steps S107 and S108 are performed in a manner similar to steps S103 and S104, and a usual operation is performed.

Thereafter, in step S109, selection as to whether to end the usual operation is made. This selection can be made by the operating mode deciding unit 60. In a case where the usual operation is not to be ended (corresponding to "No" in FIG. 7), steps S107, S108, and S109 are performed again, and the usual operation is maintained. In a case where the usual operation is to be ended (corresponding to "Yes" in FIG. 7), the flowchart in FIG. 7 ends.

Second Embodiment

In the first embodiment, the case where the compressor remains stopped before a usual operation has been described in detail, however, the compressor may rotate before a usual operation. That is to say, in the period during which the lower limit Lm is set to the candidate lower limit L2, control of the inverter 3 based on the instantaneous space vector may be performed while the compressor is caused to rotate. This case can be considered to be a case where, although the compressor is operating, control is performed so that a transition from a preliminary operation in which iron loss is large and efficiency is low to a usual operation in which iron loss is small and efficiency is high occurs.

Third Embodiment

In the second embodiment, control for starting the compressor may be performed before the preliminary operation. In this case, preheating heat may be generated in the preliminary operation as in the second embodiment. Therefore, by using the candidate lower limit L1 as the lower limit Lm in the control before the preliminary operation, the compressor can be efficiently started.

FIG. 9 is a flowchart showing part of an operation in a third embodiment. In this embodiment, the flowchart includes, in addition to steps S101 to S109 in the flowchart shown in FIG. 7, steps S201, S202, S203, and S204. These steps are provided between steps S101 and S102. Therefore, steps S103 to S109 are omitted in FIG. 9.

Step S101 is performed similarly to the first embodiment and the second embodiment. In a case where a start of the compressor is selected, steps S201 to S204 are performed prior to step S102 in this embodiment. In step S201, the candidate lower limit L1 is selected as the lower limit Lm. This selection can be made in accordance with the switch signal J. Thereafter, the voltage vector commands [τV]* are generated in step S202 similarly to steps S103 and S107, and the switching signals Gup, Gyp, Gwp, Gun, Gvn, and Gwn are generated in step S203 similarly to steps S104 and S108.

Thereafter, the process in step S102 and the subsequent steps is performed similarly to the first embodiment and the second embodiment.

Selection of the candidate lower limit L1 as the lower limit Lm in step S201 as in the case of a usual operation is not always necessary. For example, the candidate lower limit group {L} may include a candidate lower limit L3 (<L2), which is a third value, and the candidate lower limits L3, L2, and L1 may be selected as the lower limit Lm in the respective cases of causing the compressor to start, perform the preliminary operation, and perform a usual operation.

Preheating heat can be generated before a usual operation even if the compressor is in a stopped state as in the first embodiment, and therefore, the compressor may be started before generating preheating heat. That is to say, at the time of starting the compressor, the candidate lower limits L3 and L2 are selected in this order, and in a subsequent usual operation, the candidate lower limit L1 is used as the lower limit Lm. It is obvious that, also in this case, L3=L1 (<L2) can be satisfied.

Also in the third embodiment, regardless of whether the candidate lower limits L1 and L3 are the same or different, it is considered that the lower limit Lm is set to the candidate lower limit L2 at least once before a usual operation as in the first embodiment and the second embodiment.

The inverter controller 6 includes, for example, a microcomputer and a memory. The microcomputer performs processing steps (in other words, procedures) written in a program. The above-mentioned memory includes one or more of various memories, such as a read-only memory (ROM), a random access memory (RAM), a rewritable nonvolatile memory (an erasable programmable ROM (EPROM) and the like), and a hard disk drive. The memory provides a work area for storing a variety of information, data, and the like, storing a program run by the microcomputer, and running the program. Here, the microcomputer can be grasped as a unit that functions as various means corresponding to the processing steps written in the program or that achieves various functions corresponding to the processing steps. The inverter controller 6 is not limited to the above-mentioned inverter controller, and some or all of the procedures performed by the inverter controller 6 or some or all of the means or the functions achieved by the inverter controller 6 may be achieved as hardware.

The inverter 3 drives the motor 5. The unit voltage vectors V0 to V7 are voltage vectors that are units composing an instantaneous space vector. This instantaneous space vector indicates the voltage Vu, Vv, and Vw which the inverter 3 outputs except in the dead time period. The magnetic flux vector Ψ(θ) corresponds to time integrals of the unit voltage vectors. In the above-mentioned pulse width modulation method, the locus of the magnetic flux vector Ψ(θ) forms the loop S. It is noted that the loop S is formed within a period shorter than the reciprocal of the maximum value of the operating frequency (in terms of electrical angle) of the motor 5. With such a pulse width modulation method, the compressor motor is caused to generate preheating heat.

The loop S is formed of the locus of time integrals of at least three types of non-zero voltage vectors among the non-zero voltage vectors V1 to V6.

The above-mentioned period is, for example, the control cycle T0.

An increase in the magnitude of the loop S or an increase in the frequency of occurrence of the loop S can increase the heating value of the motor 5.

The locus of the magnetic flux vector Ψ(θ) in the above-mentioned period is apart from the origin in the complex plane in which the initial points of all the unit voltage vectors V1 to V6 are located at the origin. The motor 5 may remain stopped. Further, the locus of the magnetic flux vector Ψ(θ) moves around the origin, and the AC current Iu, Iv, and Iw necessary for rotating the motor 5 flows into the motor 5.

The lower limit Lm of vector widths, which correspond to the lengths of the times τ4' and τ6' for which at least a pair of non-zero voltage vectors V4 and V6 among the non-zero voltage vectors are continuously maintained respectively is equal to the candidate lower limit L2 larger than the candidate lower limit L1 that is set in a usual operation of the motor 5. By making the lower limit Lm changeable, efficiency can be increased without the occurrence of unwanted iron loss in a usual operation, and iron loss, and accordingly, preheating heat can be generated before a usual operation.

For example, in a period during which the lower limit Lm is set to the candidate lower limit L1, in a period during which the unit voltage vectors V0 to V7 are maintained, current that is input into the inverter 3 can be measured as DC current Idc.

Prior to a period during which the lower limit Lm is set to the candidate lower limit L2, the lower limit Lm may be set to the candidate lower limit L3 smaller than the candidate lower limit L2, and the inverter 3 may be controlled to start the motor 5.

The embodiments have been described above. It should be understood that various changes can be made to the forms and details without departing from the spirit and scope of the claims. The above-mentioned embodiments and modifications can be combined with each other.

The invention claimed is:

1. A pulse width modulation method in which a locus of integrals, in terms of time, of unit voltage vectors forms a loop within a period shorter than a reciprocal of a maximum value of an operating frequency, in terms of electrical angle, of a compressor motor, said unit voltage vectors being voltage vectors that are units composing an instantaneous space vector indicating voltage which an inverter for driving said compressor motor outputs except in a dead time period.

2. The pulse width modulation method according to claim 1, wherein said loop is formed by the locus of integrals, in terms of time, of at least three types of non-zero voltage vectors that are said voltage vectors having non-zero magnitudes.

3. The pulse width modulation method according to claim 1, wherein said period is a control cycle for said inverter.

4. The pulse width modulation method according to claim 2, wherein said period is a control cycle for said inverter.

5. The pulse width modulation method according to claim 1, wherein an increase in a magnitude of said loop or an increase in a frequency of occurrence of said loop increases a heating value of said compressor motor.

6. The pulse width modulation method according to claim 2, wherein an increase in a magnitude of said loop or an increase in a frequency of occurrence of said loop increases a heating value of said compressor motor.

7. The pulse width modulation method according to claim 3, wherein an increase in a magnitude of said loop or an increase in a frequency of occurrence of said loop increases a heating value of said compressor motor.

8. The pulse width modulation method according to claim 4, wherein an increase in a magnitude of said loop or an increase in a frequency of occurrence of said loop increases a heating value of said compressor motor.

9. The pulse width modulation method according to claim 1, wherein said loop is formed in a state where said compressor motor remains stopped.

10. The pulse width modulation method according to claim 1, wherein said loop is formed in a state where said compressor motor is rotating.

11. The pulse width modulation method according to claim 1, wherein a lower limit of vector widths is equal to a second value larger than a first value that is set in a usual operation of said compressor motor, said vector widths corresponding to lengths of times for which at least a pair of non-zero voltage vectors that are said unit voltage vectors having non-zero magnitudes are continuously maintained respectively.

12. The pulse width modulation method according to claim 11, wherein in a period during which said lower limit is set to said first value, in a period during which said unit voltage vectors are maintained, current that is input into said inverter is measurable as DC current.

13. The pulse width modulation method according to claim 11, wherein prior to a period during which said lower limit is set to said second value, said lower limit is set to a third value smaller than said second value, and said inverter is controlled to start said compressor motor.

14. The pulse width modulation method according to claim 12, wherein prior to a period during which said lower limit is set to said second value, said lower limit is set to a third value smaller than said second value, and said inverter is controlled to start said compressor motor.

* * * * *